May 18, 1943. C. W. ZWIRN 2,319,284
PROJECTION APPARATUS
Filed Sept. 8, 1941 2 Sheets-Sheet 1
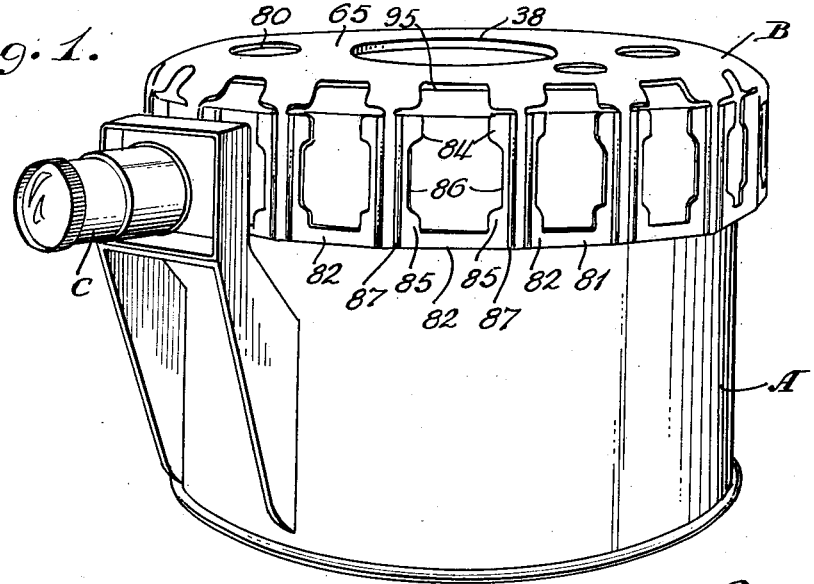
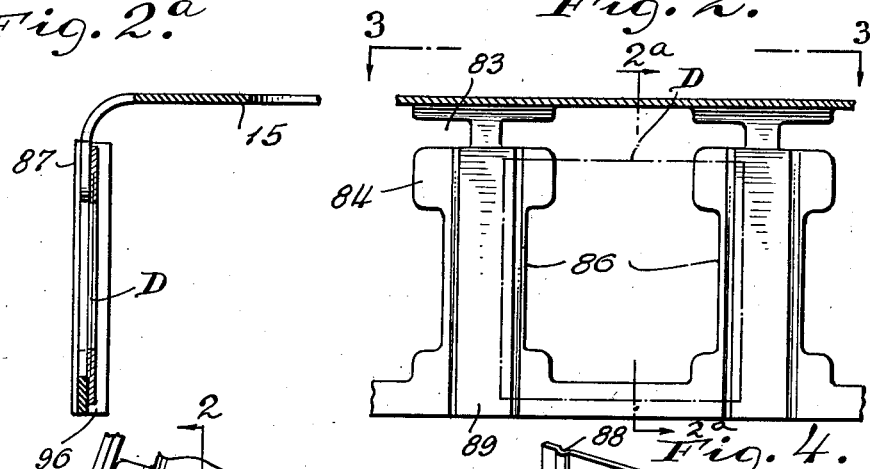
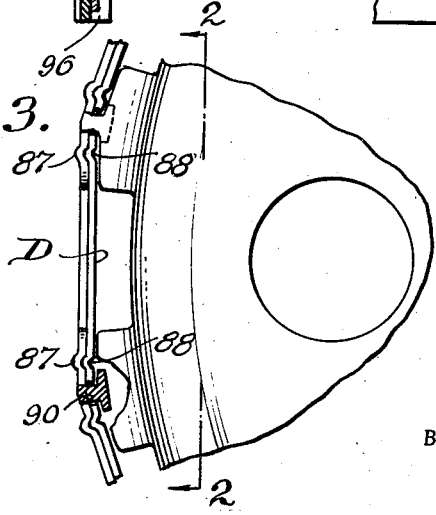
INVENTOR.
CHARLES W. ZWIRN
BY
ATTORNEY May 18, 1943. C. W. ZWIRN 2,319,284
PROJECTION APPARATUS
Filed Sept. 8, 1941 2 Sheets-Sheet 2

INVENTOR.
CHARLES W. ZWIRN
BY
ATTORNEY

Patented May 18, 1943

2,319,284

UNITED STATES PATENT OFFICE 2,319,284

PROJECTION APPARATUS

Charles W. Zwirn, New York, N. Y.

Application September 8, 1941, Serial No. 410,035

2 Claims. (Cl. 88—27)

The present application relates to a projection apparatus, and it particularly relates to a slide projection apparatus.

In connection with most projection apparatus utilizing photographic reproductions, it is necessary to have heavy cumbersome metallic frames and rotatable structures to carry the slides and the slides themselves are usually of bulky construction or not readily mounted or positioned in the projection apparatus.

These devices are not only quite expensive and cumbersome, but furthermore do not readily lend themselves to display purposes as, for example, where it is necessary to inexpensively and promptly view a large number of slides and examine and display or project the subject matter of said slides within a relatively short time.

These bulky devices are not most satisfactory where photographs of terrain are to be examined after pictures have been taken, for example, from an aeroplane and/or where photographs of a large number of samples of merchandise, such as wearing apparel, fabrics, toilet articles, etc., must be promptly displayed and examined by a prospective customer.

Although not limited thereto, the present invention will be particularly described in connection with its application to colored photographic plates as, for example, those which may be produced by the Kodachrome or Kodacolor process or by the Dufay color process, as from an aeroplane, or of dresses or garments which are to be displayed to prospective purchasers without the necessity of actually showing or displaying the garment itself.

It is among the objects of the present invention to provide a simple, inexpensive, light weight, readily handled apparatus for the purpose above described, which may be operated over long periods of time without difficulty and without particular skill and training.

Another object is to provide an improved slide arrangement which will be inexpensive and light and readily manufactured and which may be readily positioned in the frame or projection device without buckling or distortion and with assurance that an accurate projection in color value and in proportionment will be achieved.

As many changes could be made in the above apparatus, and many apparently widely different embodiments of this invention could be made without departing from the scope of the claims, it is intended that all matter contained in the above description or shown in the accompanying drawings shall be interpreted as illustrative and not in a limiting sense.

In accomplishing the above objects, it has been found most satisfactory to form a projecting machine with a relatively light weight base casing carrying the motor and step-by-step slide progression advancement arrangement, and also a suitable light source and projection lenses.

The vital portion of the present invention to which the present invention is most particularly directed is the removable rotatable cap or head which fits upon this lower casing. This head is desirably formed of a light weight molded synthetic plastic material, may be provided with a rotating mount or a revolving mount upon the base and may be caused to be advanced progressively of the subject matter upon each of the slides.

The head is preferably peripherally provided with a plurality of frames in a depending skirt having vertical grooves or alignment connections which, in turn, cooperate with vertical grooves on alignment connections in the slides.

The slides themselves desirably consist of thin paper frames carrying the photographs, the sides of the slides being desirably provided with ridges or grooves extending vertically thereof cooperating with similar grooves in the frame members.

The construction of slide, of frame member therefor and the combination thereof is not per se being claimed herein, but is the subject matter of my copending application Serial No. 476,669, filed Feb. 22, 1943.

Various other objects, features and advantages of the invention will be apparent from the following particular description, and from an inspection of the accompanying drawings, in which Fig. 1 is a side perspective view of one form of device according to the present application;

Fig. 2 is a fragmentary elevation, partly in section upon the line 2—2 of Fig. 3;

Fig. 2a is a section on the line 2a—2a of 2;

Fig. 3 is a partial plan view upon the line 3—3 of Fig. 2, upon a large scale as compared to Fig. 1;

Fig. 4 is a perspective front view of one form of slide which may be utilized according to the present invention;

Figure 5:
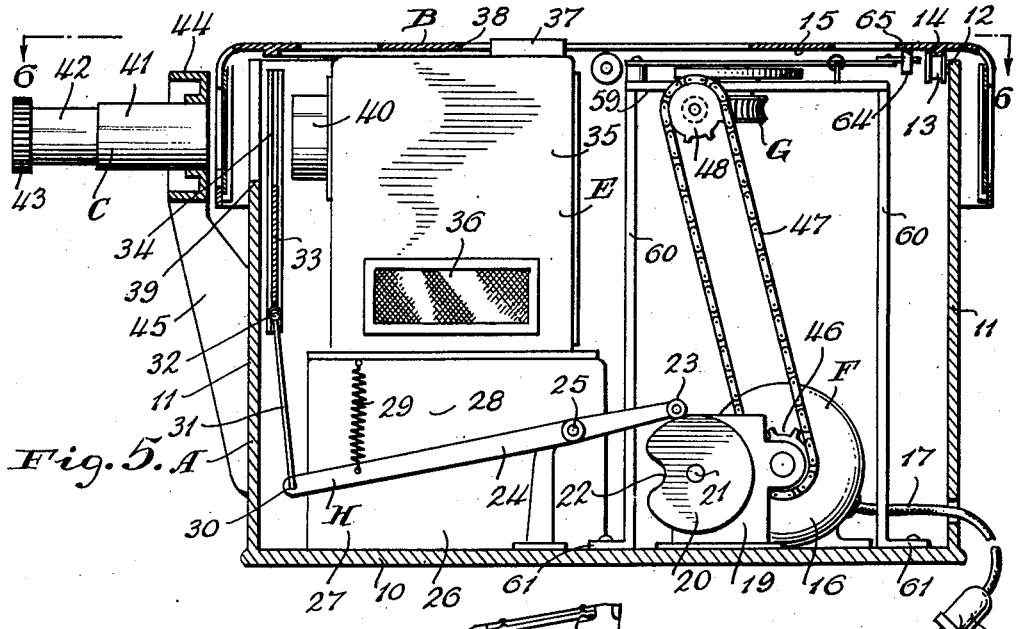
Fig. 5 is a transverse side sectional view upon the line 5—5 of Fig. 6.
Figure 6:
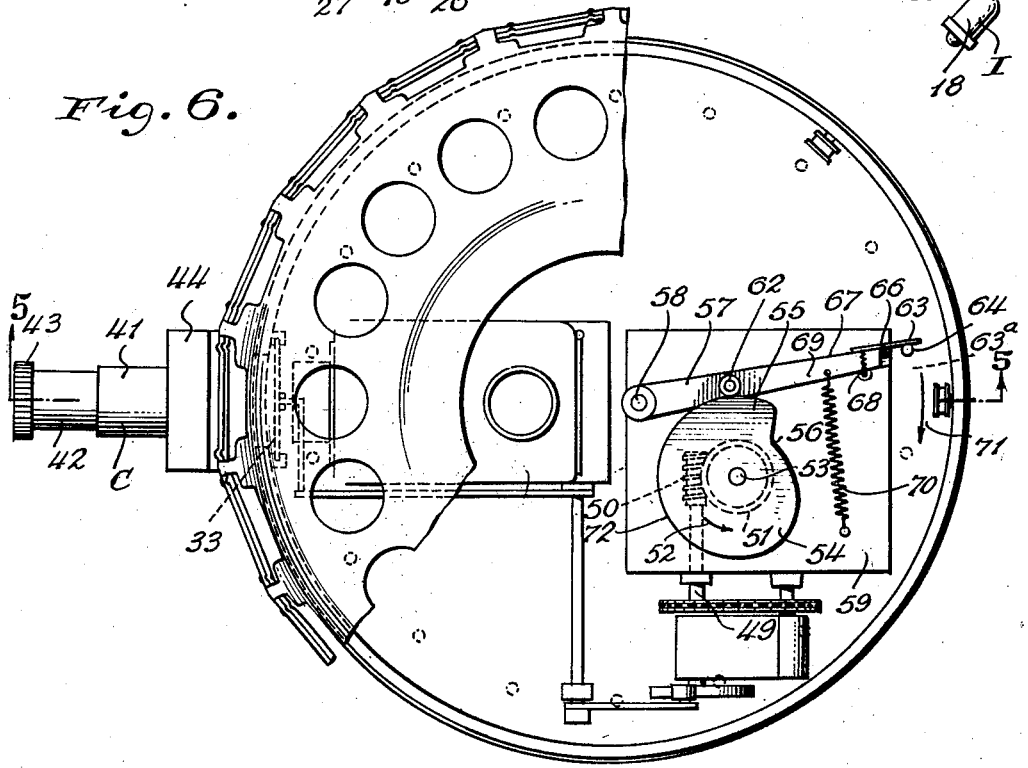
Fig. 6 is a top view, partly in section, upon the line 6—6 of Fig. 5.

Referring to Figs. 1, 5 and 6, the device is provided with a cylindrical base A, a rotatable head B to which the present invention is most particularly directed, a projecting lens arrangement C, a slide arrangement D to which the invention is also particularly directed, a lantern E, a motor F, a progressive arrangement G, a shutter arrangement H, and a remote control device I.

The casing A as shown in Figs. 1, 5 and 6 may be made of light weight metal or preferably of a molded plastic, and it has a base 10 with cylindrical side walls 11, which extend substantially to the top of the device as indicated at 12 and carry a plurality of rollers 13 which are grooved to receive the ridge 14 on the lower face 15 of the rotatable head B.

Upon the base 10 is mounted the motor 16, having the control wires 17 which connect it to the push button 18 which may be positioned remotely or a substantial distance from the casing A.

The motor is provided with a reducing gear arrangement 19 to drive the cam 20 through the shaft 21. The cam 20 has a notch 22 which cooperates with the roller or follower 23 on the arm 24 which is pivotally mounted at 25 on the side 26 of the base 27 supporting the lantern construction E.

The left hand portion of the lever is normally biased upwardly as indicated by the arrow 28, by the spring 29.

The left end of the lever 24 is connected at 30 to the link 31 which at its upper end has a pivotal connection at 32 to a shutter 33 which slides upwardly and downwardly in the side guide members 34.

The lantern A, which is supported upon the base 27, has a high powered light therein, not shown.

The casing 35 is provided with ventilating openings 36 and 37, the opening 37 projecting through a central opening 38 in the rotatable head B. The front of the cylindrical side wall 11 of the base A is cut away, notched or recessed, as indicated at 39, opposite the projecting lens 40 which is positioned so as to project a beam of light forwardly between the slides 34 for the shutter 33, and in which the device C condenses and changes the direction of the rays so that they may be projected with intensity upon a screen or other surface. The device C consists of the adjustable telescoping cylindrical members 41 and 42, with a rotatable knurled end piece 43 which are held by the support member 44 which is, in turn, supported by upwardly extending parallel brackets 45 which are attached to the lower portion of the cylindrical base A.

The progression arrangement is driven by motor F through the pulley 46 and the belt 47 which may be replaced by gearing if desired or other power transmitting devices. The belt, in turn, drives the pulley 48, which drives the shaft 49 (see Fig. 6) having the worm 50 thereon driving the gear 51 in the direction 53. The gear 51 is on the shaft 53, which also carries the cam 54 having an elevation 55 and a recess 56. The follower lever 57 is pivotally mounted at 58 upon the table 59 supported on the leg 60 which are in turn supported at 61 upon the base 10.

The shafts 49 and 53 are supported by and on the table 59, which is supported on the leg 60 from the feet 61 upon the base 10. The follower lever is provided with the roller 62 which contacts the cam 54 as the cam rotates in the direction 52. At the end of the lever 57 is provided the latch 63 which cooperates with the studs 64 molded integrally with and extending downwardly from the outer upper portion 65 of the rotatable head B. The latch 63 is pivotally mounted at 66 upon the end of the lever 57 and is normally held flat against the face 67 of the lever 57 by the spring 68. The lever 57 is normally biased in the direction 71 by the spring 70.

When the cam moves to permit the roller 62 to slide into the recess 56 under the influence of the spring 70, the rotatable head B will be moved the width of one slide or frame in the direction 71, as indicated upon Fig. 6. Upon return movement of the lever 57, due to contact of the roller 62 with the elevating surface 72 of the cam 54, the latch 63 will be bent to pass the next projection 64 into the dotted line position as indicated at 63a in Fig. 6. The notch 22 in the cam 20 in Fig. 5 is so coordinated with the notch 56 and the cam 54, that the shoulder 33 will be elevated in the guides 34 to cut off the beam of light between the guides 34 when the roller 62 descends into the recess 56 and advances the rotatable head by one slide.

The rotatable head B and the slide D, to which the present invention is particularly directed, are best shown upon Figs. 1 to 4.

As shown in Fig. 1, the rotatable head B which may be made of a molded plastic or even of thin light-weight metal which is not preferred, has a central ventilating opening 38, a flat upper portion 65 with the ventilating openings 80 extending peripherally therearound. The under face 15 of the flat upper portion 65 is provided with spaced projections 64 as well as the ridge 14 best shown in the upper right-hand corner of Fig. 5, the function of which has been previously described.

Formed integrally with the top 65 of the rotatable head B are the descending side walls 80 which are formed into a series of frame members 82. It will be noted that each of the frame members 82 are separated by the notches 83 from the top 65 of the rotatable head B, and the sides of these frame members are provided with projecting portions 84 and 85 which are positioned above and below the slides D and which cover the corners of the slides and with the enlarged or recessed portions 86 which correspond to the sides of the slide and give a full wide display. Beyond the enlarged sides 86, extend the vertical curved grooves 87 which correspond to the curved ridges 88 in the slide D and which are designed to accommodate the ridges 88 in the slide D. The backs of the frames 82 are formed by the strips 89 which may be riveted thereto or adhesively connected thereto, as indicated at 90, and are sufficiently spaced along the sides of the frames 82 to permit insertion of the side edges 91 of the slides D of Fig. 4.

Referring to slides D, it will be noted that each may be formed of two sheets of paper or of one sheet of stiff paper 92, having the opening 93 in which is positioned the colored or other photograph 94. The ridges 88 and the side edges 91 fit into the sides of the frames 82 and bulging or distortion is thus prevented. The recesses at 83 and the openings at 95 permit ready insertion or removal of the slides D which may be grasped through the openings 95, and although said openings 95 leave an open space above the slide in the rotatable head B, nevertheless, the high side walls 11 of the base A will conceal the interior mechanism.

It will be noted that the spacing of the rear members 89 is obtained by turning in the bottoms thereof, as indicated at 96, which leaves enough space for the slide D to be inserted.

While certain novel features of the invention have been shown and described and are pointed out in the annexed claims, it will be understood that various omissions, substitutions and changes in the forms and details of the machine process and product illustrated and in its operation and in the form and details of the apparatus may be made by those skilled in the art without departing from the spirit of the invention.

What is claimed is:

1. A slide projecting apparatus comprising a supporting base and a substantially cylindrical housing extending upwardly therefrom, an inverted cup-shaped slide holding canopy formed of a top portion and a lateral peripheral portion, means for rotatably mounting said canopy on said supporting base and overlying the top of said housing, a light projector mounted within said housing to project light through a projection opening at the upper portion of one peripheral section of said housing, means in said housing to rotate said canopy in a horizontal plane in stepwise fashion to bring successive slides into the projection field, and a projection lens assembly mounted on said base in projection alignment, and disposed on the outside of said canopy and laterally thereof on the side opposite said light projector, said canopy having slide receiving frames formed in the lateral portion thereof provided with vertical lateral grooves for the slide holders and having openings at the top of said lateral portion and in said top portion of said canopy for facilitating the charging and removal of the slide holders associated with said canopy.

2. A slide projecting apparatus comprising a supporting base and a substantially cylindrical housing extending upwardly therefrom, an inverted cup-shaped slide holding canopy formed of a top portion and a lateral peripheral portion, means for rotatably mounting said canopy on said supporting base and overlying the top of said housing, a light projector mounted within said housing to project light through a projection opening at the upper portion of one peripheral section of said housing, means in said housing to rotate said canopy in a horizontal plane in stepwise fashion to bring successive slides into the projection field, a projection lens assembly mounted on said base in projection alignment, and disposed on the outside of said canopy and laterally thereof on the side opposite said light projector, said canopy having slide receiving frames formed in the lateral portion thereof provided with vertical grooves at the front thereof to receive corresponding ridges on the slide holders, projections at the top and bottom of the frame forming an enlarged opening therebetween for stabilizing the retention of the slide holders while permitting an adequate display of the slides, and said frames having openings at the top of said lateral portion and in said top portion of said canopy for facilitating the charging and removal of the slide holders associated with said canopy.

CHARLES W. ZWIRN.